US010791092B2

(12) United States Patent
Tiagi et al.

(10) Patent No.: US 10,791,092 B2
(45) Date of Patent: Sep. 29, 2020

(54) FIREWALL RULES WITH EXPRESSION MATCHING

(71) Applicant: Nicira, Inc., Palo Alto, CA (US)

(72) Inventors: Alok Tiagi, Palo Alto, CA (US);
Jayant Jain, Palo Alto, CA (US);
Sushruth Gopal, Sunnyvale, CA (US);
Anirban Sengupta, Saratoga, CA (US);
Subrahmanyam Manuguri, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 271 days.

(21) Appl. No.: 15/897,129

(22) Filed: Feb. 14, 2018

(65) Prior Publication Data
US 2019/0253390 A1    Aug. 15, 2019

(51) Int. Cl.
*H04L 29/06*    (2006.01)
*H04L 29/08*    (2006.01)

(52) U.S. Cl.
CPC ...... *H04L 63/0236* (2013.01); *H04L 63/0263* (2013.01); *H04L 67/02* (2013.01); *H04L 69/325* (2013.01); *H04L 69/326* (2013.01)

(58) Field of Classification Search
CPC ............. H04L 63/0236; H04L 63/0263; H04L 69/325; H04L 69/326; H04L 67/02; H04L 69/22
See application file for complete search history.

(56) References Cited

U.S. PATENT DOCUMENTS

| | | | | |
|---|---|---|---|---|
| 2004/0210663 | A1* | 10/2004 | Phillips | H04L 67/1014 709/230 |
| 2005/0022010 | A1* | 1/2005 | Swander | H04L 63/0218 726/4 |
| 2009/0141634 | A1* | 6/2009 | Rothstein | H04L 47/2483 370/236 |
| 2011/0231924 | A1* | 9/2011 | Devdhar | H04L 63/0236 726/11 |
| 2013/0034100 | A1* | 2/2013 | Goyal | H04L 45/745 370/392 |
| 2013/0282766 | A1* | 10/2013 | Goyal | G06F 16/22 707/803 |
| 2014/0153435 | A1* | 6/2014 | Rolette | H04L 63/0245 370/252 |
| 2015/0189046 | A1* | 7/2015 | Worrell | H04L 69/22 370/474 |

(Continued)

OTHER PUBLICATIONS

Author Unknown, "Check Point IPS Engine Architecture: New Technologies Provide a Robust Integrated Intrusion Prevention System," May 4, 2009, 13 pages, Check Point Software Technologies, LTD.

(Continued)

*Primary Examiner* — Michael R Vaughan
(74) *Attorney, Agent, or Firm* — Adeli LLP

(57) ABSTRACT

Some embodiments provide a method that receives a packet, having a set of one or more layer 7 (L7) expressions, from a datapath. The method identifies a set of datapath firewall rules that match on expressions in the set of expressions. The method provides identifiers for the datapath firewall rules of the identified set to the datapath. The datapath uses the identifiers and additional packet header data to determine a matching firewall rule from the set of datapath firewall rules.

20 Claims, 6 Drawing Sheets

(56) References Cited

U.S. PATENT DOCUMENTS

| | | | |
|---|---|---|---|
| 2016/0099891 A1* | 4/2016 | Zhou | H04L 12/6418 709/202 |
| 2016/0226821 A1* | 8/2016 | Zhang | H04L 45/72 |
| 2017/0048200 A1* | 2/2017 | Chastain | G06F 9/45558 |
| 2018/0131675 A1* | 5/2018 | Sengupta | H04L 63/0263 |
| 2019/0215307 A1* | 7/2019 | Gopal | G06F 9/45533 |
| 2019/0222558 A1* | 7/2019 | Kahn | H04L 63/0236 |
| 2019/0253387 A1* | 8/2019 | Verma | H04L 63/20 |

OTHER PUBLICATIONS

Author Unknown, "Day in the Life of a Packet," PAN-OS Packet Flow Sequence PAN-OS 6.1: Revision A, Month Unknown 2015, 14 pages, Palo Alto Networks, Inc.

Author Unknown, "Layer 7 Visibility and Control," White Paper, Feb. 2013, 11 pages, Meraki, Inc.

Author Unknown, "Technologies: Layer 7 Visibility," Month Unknown 2018, 2 pages, Cisco Systems, Inc.

\* cited by examiner

FIREWALL RULES WITH EXPRESSION MATCHING

BACKGROUND

A typical firewall matches on layer 3 (L3) and layer 4 (L4) headers (e.g., TCP and IP header fields) and performs blocks/drops/allows traffic based on these header fields. In some cases, a network administrator will want to have the firewall match on layer 7 (L7) expressions (e.g., HTTP expressions) as well as the L3/L4 header fields. For a centralized, dedicated firewall device integrating such expression matching is not as difficult. However, for firewalls that operate in the datapath of host machines (e.g., as is often the case for distributed firewalls), additional challenges need to be overcome.

BRIEF SUMMARY

Some embodiments provide a method for incorporating L7 expression matching into firewall rules. Specifically, some embodiments implement a separate module outside the datapath that receives packets from the datapath, identifies the L7 expressions present in the packets, and provides identifiers to the datapath specifying (i) the expressions present in the packet and (ii) the rules that match on these expressions. The datapath uses this data to identify a matching firewall rule to apply to each such packet.

In some embodiments, the datapath executes in the kernel of virtualization software of a host machine to handle packets (e.g., between a virtual machine or other data compute node and a virtual switch port), and applies various services to the packets. These services include firewall processing (e.g., for a distributed firewall). The datapath firewall service, in some embodiments, includes a set of firewall rules that match on L3 and L4 header field values (and may also include layer 2 (L2) header field values), which are ordered according to priority. In some embodiments, these rules may also include matches on expression identifiers.

A packet is initially received by the datapath, and if this packet requires L7 processing (e.g., because the highest-priority rule matched by the L2-L4 header fields of the packet also includes matches on one or more expression identifiers), the datapath sends the packet to the L7 expression matching module which, in some embodiments, operates in the user space of the host machine's virtualization software.

The L7 expression matching module of some embodiments provides a set of identifiers back to the datapath for the packet. The L7 expression matching module identifies the expressions present in the packets, each of which are represented by expression identifiers. In addition, the expression matching module stores a mapping of expression identifiers to firewall rules that match on the expression identifiers. In some embodiments, for each expression identifier, the expression matching module identifies all of the rules that match on that expression identifier. Thus, for a packet with several expressions, the expression matching module identifies all of the expression identifiers for the packet and all of the firewall rules that match on one or more of those expression identifiers. The expression matching module provides the expression identifiers and rule identifiers back to the datapath in some embodiments.

The datapath also identifies all of the rules that match the L2-L4 header fields of the packet, in some embodiments doing so in parallel with the operations of the expression matching module. The datapath can then identify the highest-priority rule that matches both (i) the L2-L4 header fields of the packet and (ii) the expression identifiers received from the expression matching module. In some embodiments, the datapath identifies qualifying rules that both match the L2-L4 header fields and are in the set of rule identifiers received from the expression matching module. The datapath can then identify a highest-priority matching rule from among these rules.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for incorporating L7 expression matching into firewall rules (e.g., for a distributed firewall). Specifically, for a datapath that implements firewall rules, some embodiments implement a separate module outside the datapath that receives packets from the datapath, identifies the L7 expressions present in the packets, and provides identifiers to the datapath specifying (i) the expressions present in the packet and (ii) the rules that match on these expressions. The datapath uses this data (as well as the packet headers) to identify a matching firewall rule to apply to each such packet.

Figure 1:
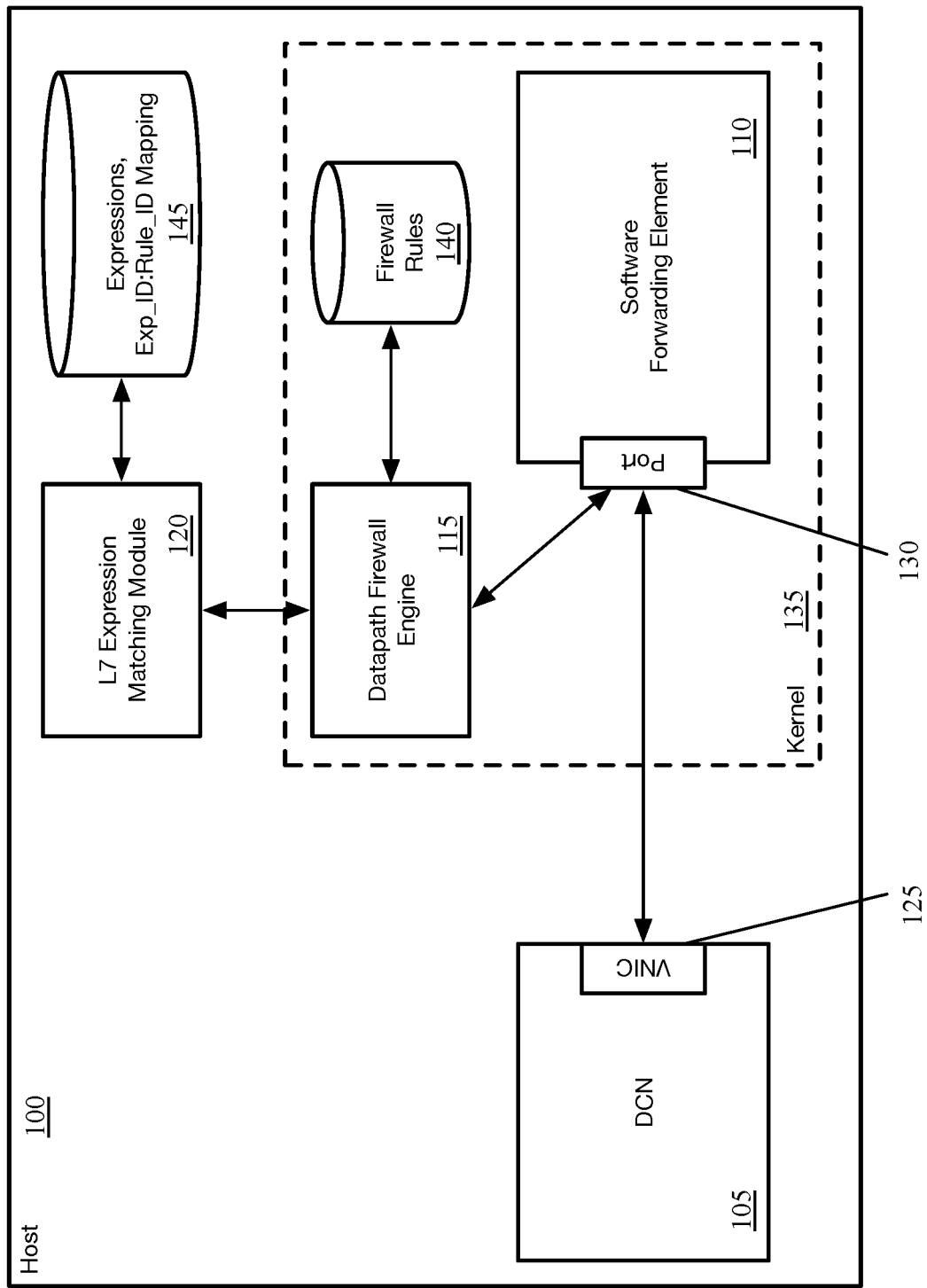
FIG. 1 conceptually illustrates packet processing architecture of a host machine of some embodiments that includes firewall processing in the datapath.

FIG. 1 conceptually illustrates at least a portion of the packet processing architecture of a host machine 100 of some embodiments that includes such firewall processing in the datapath. As shown, the host machine 100 includes a data compute node 105, a software forwarding element 110, a datapath firewall engine 115, and an L7 expression matching module 120. The data compute node 105 may be a virtual machine, container (e.g., a namespace, a Docker container, etc.), or other virtualized data compute node that operates on a host machine. In some embodiments, the DCN 205 implements a web server, application server, database server, etc. The host machine 100 may include numerous such DCNs, often managed by different tenants and connected to different logical networks.

The DCN 105 includes a virtual network interface controller (VNIC) 125 through which the DCN 105 sends and receives data messages. The VNIC 125, in some embodiments, is a software abstraction created by the virtualization software (e.g., hypervisor) of the host machine to virtualize the physical NICs (PNICs) of the host machine.

The VNIC 125 enables the DCN 105 to send data messages to and receive data messages from the software forwarding element (SFE) 110, via a port 130. The SFE 110 of some embodiments operates in the kernel 135 of the host machine's virtualization software to perform packet forwarding for packets sent to and from the various DCNs operating on the host machine 100. In some embodiments, the SFE 110 implements logical forwarding elements (e.g., logical switches and/or logical routers), which connect DCNs operating on multiple host machines and are also implemented by SFEs operating on these other host machines. These logical forwarding elements are defined to specify different logical networks for different users in some embodiments. The logical forwarding elements are defined so as to isolate the data traffic for different logical networks from each other, even when handled by the same SFE. The SFE 110 is configured by a network control system (e.g., by a combination of central controllers/managers and local controllers) to implement these various logical forwarding elements.

In some embodiments, the port 130 implements at least a portion of the datapath for data messages to and from the DCN 105 via function calls to one or more modules that implement various datapath operations on the data messages. These modules include the datapath firewall engine 115 in some embodiments, as well as other modules for operations such as ARP and DHCP broadcast suppression, load balancing, network address translation, etc. In some embodiments, the datapath firewall engine 115 as well as the other datapath modules execute in the kernel 135 of the host machine's virtualization software.

The datapath firewall service, in some embodiments, stores a set of firewall rules 140 that match on L3 and L4 header field values (and may also include layer 2 (L2) header field values), and which are ordered according to priority. For instance, in some embodiments the firewall rules match on data flow 5-tuples (i.e., source and destination IP address, source and destination transport layer port, and transport protocol) and specify actions (e.g., allow, drop, etc.) based on these 5-tuples. In other embodiments, the firewall rules may include different combinations of L2-L4 packet header fields (e.g., source and/or destination MAC addresses, etc.).

In addition, in some embodiments, the firewall rules 140 also include matches on expression identifiers. These expressions may refer to layer 7 protocol verbs and/or other expressions, such as HTTP (or HTTPS) methods and arguments of these methods. The methods can include operations such as get, put, post, delete, etc., and the arguments could include URLs and/or filepaths. Other types of expressions (for HTTP or for other protocols, such as FTP, SMTP, etc.) are also possible.

However, in some embodiments, the datapath firewall engine is not optimal for or not capable of determining what expressions are actually present in a packet, as the datapath does not typically review L7 protocol headers. Thus, when a packet requires L7 processing in some embodiments, the datapath firewall engine 115 sends the packet to the L7 expression matching module 120. In some embodiments, the datapath firewall engine 115 determines that a packet requires L7 processing when the highest-priority rule matched by the L2-L4 header fields of the packet also includes a match on one or more expression identifiers (if the highest-priority rule matched by the L2-L4 header fields of the packet does not match on any expression identifiers, then this rule is treated as the matching rule without requiring the additional expression analysis).

As shown in FIG. 1, in some embodiments the L7 expression matching module 120 operates outside of the virtualization software kernel 135 in the user space. This module 120 may operate as a user space daemon or agent within the user space of the virtualization software, in a separate data compute node (e.g., within a service VM), etc.

The L7 expression matching module 120 of some embodiments receives a packet from the datapath firewall engine 115 and provides a set of identifiers back to the datapath firewall engine 115. As shown, the L7 expression matching module 120 stores (i) a set of expressions and their corresponding expression identifiers over which the datapath firewall engine rules match and (ii) a mapping of the expression identifiers to rule identifiers for the firewall rules that match on these identifiers (shown as storage 145).

The L7 expression matching module 120 analyzes the packets received from the datapath firewall engine 115 to identify the expressions present in the packets (and thus the expression identifiers for these expressions). In some embodiments, for each expression identifier corresponding to an expression present in the packet, the expression matching module identifies all of the rules that match on that expression identifier (using the mapping of expression identifiers to rule identifiers). Thus, for a packet with several expressions, the expression matching module 120 identifies all of the expression identifiers for the packet and all of the firewall rules that match on one or more of those expression identifiers. The expression matching module 120 provides the expression identifiers and rule identifiers back to the datapath firewall engine 115 in some embodiments.

The datapath firewall engine 115 also identifies all of the rules that match the L2-L4 header fields of the packet, in some embodiments doing so in parallel with the operations of the expression matching module 120. The datapath firewall engine 115 uses this set of rules along with the expression identifiers from the expression matching module 120 to identify the highest-priority rule that matches both (i) the L2-L4 header fields of the packet and (ii) the expression identifiers received from the expression matching module. In some embodiments, the datapath firewall engine 115 first identifies qualifying rules that both match the L2-L4 header fields and are in the set of rule identifiers received from the expression matching module 120. The datapath firewall engine 115 then uses the expression identifiers to identify a highest-priority matching rule from among these rules using the expression identifiers, and applies this rule to the packet.

In some embodiments, a configuration agent operating either in the kernel 135 or the user space of the virtualization software configures the datapath firewall engine 115 and the expression matching module 120. This configuration agent receives firewall rules from the network control system (e.g., the same network control system that configures the SFE 110) and installs these rules 140 in the datapath firewall engine 115 in some embodiments, converting expression matches to expression identifier matches. In addition, the configuration agent provides to the expression matching module 120 the expression to expression identifier mappings as well as the expression identifier to rule identifier mappings 145. As a user modifies firewall rules, adds new rules, etc., the configuration agent updates the expression identifier to rule identifier mappings 145 as well as the firewall rules 140.

It should be understood that the architecture illustrated in FIG. 1 is only one example of a datapath and expression matching module architecture. In other embodiments, for example, the firewall rules are implemented within the software forwarding element (e.g., within a kernel datapath of a flow-based forwarding element), with the expression matching module implemented in the user space. In still other embodiments, the expression matching module is also implemented in the virtualization software kernel, or both the datapath and the expression matching module are implemented in the user space (e.g., using a dpdk-based datapath). In addition, in some embodiments the firewall processing is part of a datapath for a software forwarding element port that does not connect directly to a VNIC of a data compute node. For example, in some embodiments a gateway forwarding element includes ports that exchange logical network traffic with physical networks external to the logical network, and these ports may have similar firewall processing in the datapath as well.

Figure 2:
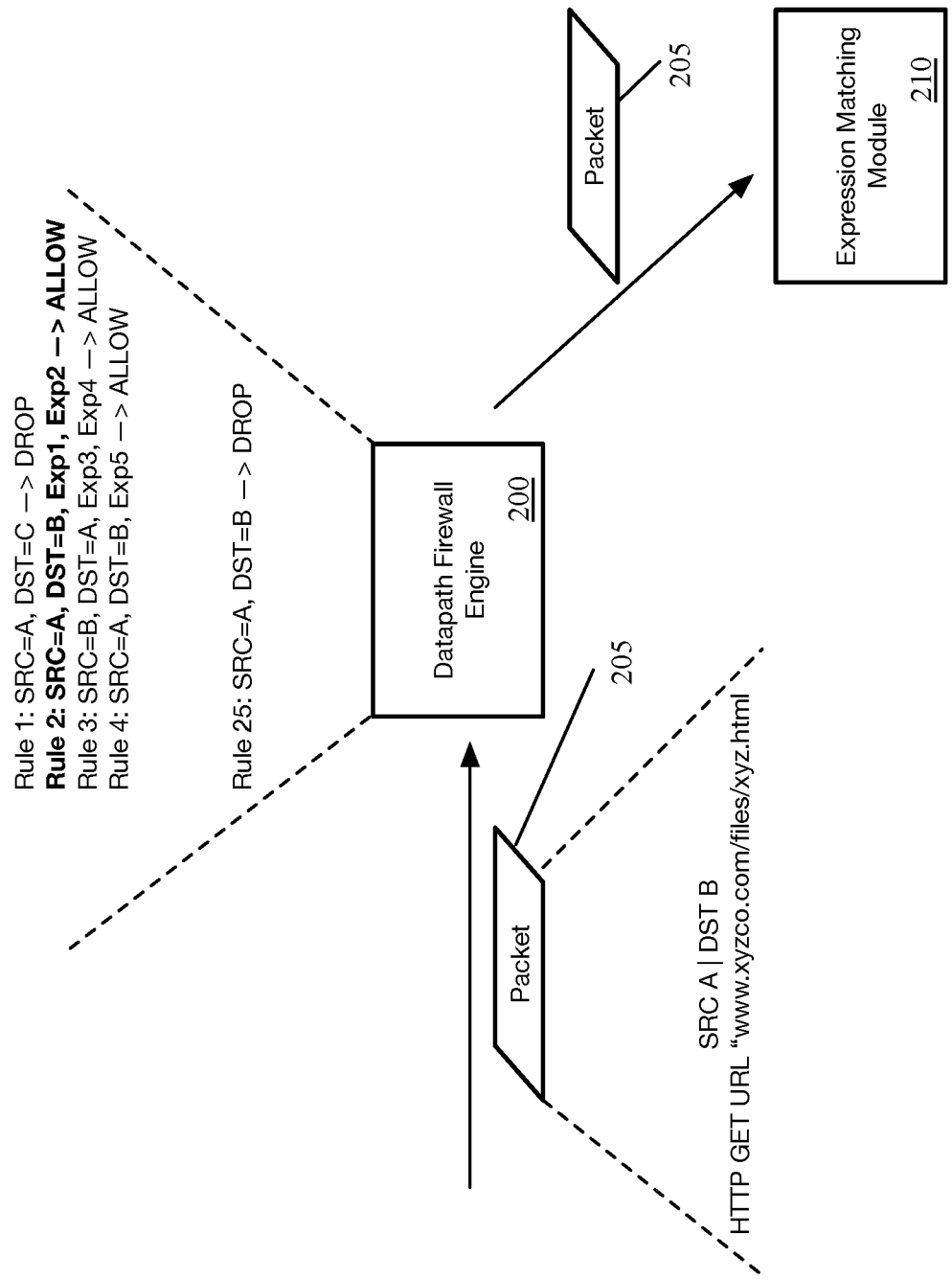
FIG. 2 conceptually illustrates a process of some embodiments for performing firewall processing using expression matching.

FIG. 2 conceptually illustrates a process 200 of some embodiments for performing firewall processing using expression matching. As shown in this figure, in some embodiments a first portion of the operations of the process 200 are performed by the datapath firewall engine (e.g., the engine 115) and a second portion of the operations are performed by the expression matching module (e.g., the module 120). The process 200 will be described in part by reference to FIGS. 3-5, which illustrate example operations of a datapath firewall engine and an expression matching module to process a packet.

As shown, the process 200 begins by receiving (at 205) a packet at the datapath firewall engine. This packet may be received at a SFE port from a DCN or be sent from the SFE to the DCN as its final destination. In some embodiments, the datapath firewall engine only analyzes packets sent in one direction (e.g., packets sent from the DCN, for which the SFE is a first hop), while in other embodiments the datapath firewall engine analyzes both incoming and outgoing data traffic.

Next, the process 200 identifies (at 210) the packet as requiring expression matching. Some embodiments process all packets (or at least the first packet of a given flow) for expression matching, while other embodiments only process packets identified specifically as requiring expression matching. For example, some embodiments identify the highest-priority firewall rule stored by the datapath engine matched by the L2-L4 headers of the packet. If this highest-priority rule only matches on the L2-L4 headers, and does not match on any expression identifiers, then this will be the highest-priority matching rule irrespective of whether any expressions are present in the packet, and thus no expression matching is required. On the other hand, if this highest-priority rule also matches on expression identifiers, then expression matching is required.

In this latter case, the process 200 sends (at 215) the packet to the L7 expression matching module. In some embodiments, this is handled by passing a software object or other representation of the packet to the module via a function call. In addition, as described above, in some embodiments the datapath firewall engine operates in the virtualization software kernel while the expression matching module operates in the user space of the virtualization software. Some embodiments, in addition to sending the packet to the expression matching module, perform additional operations in parallel with the expression matching module operations, which are described further below.

Figure 3:
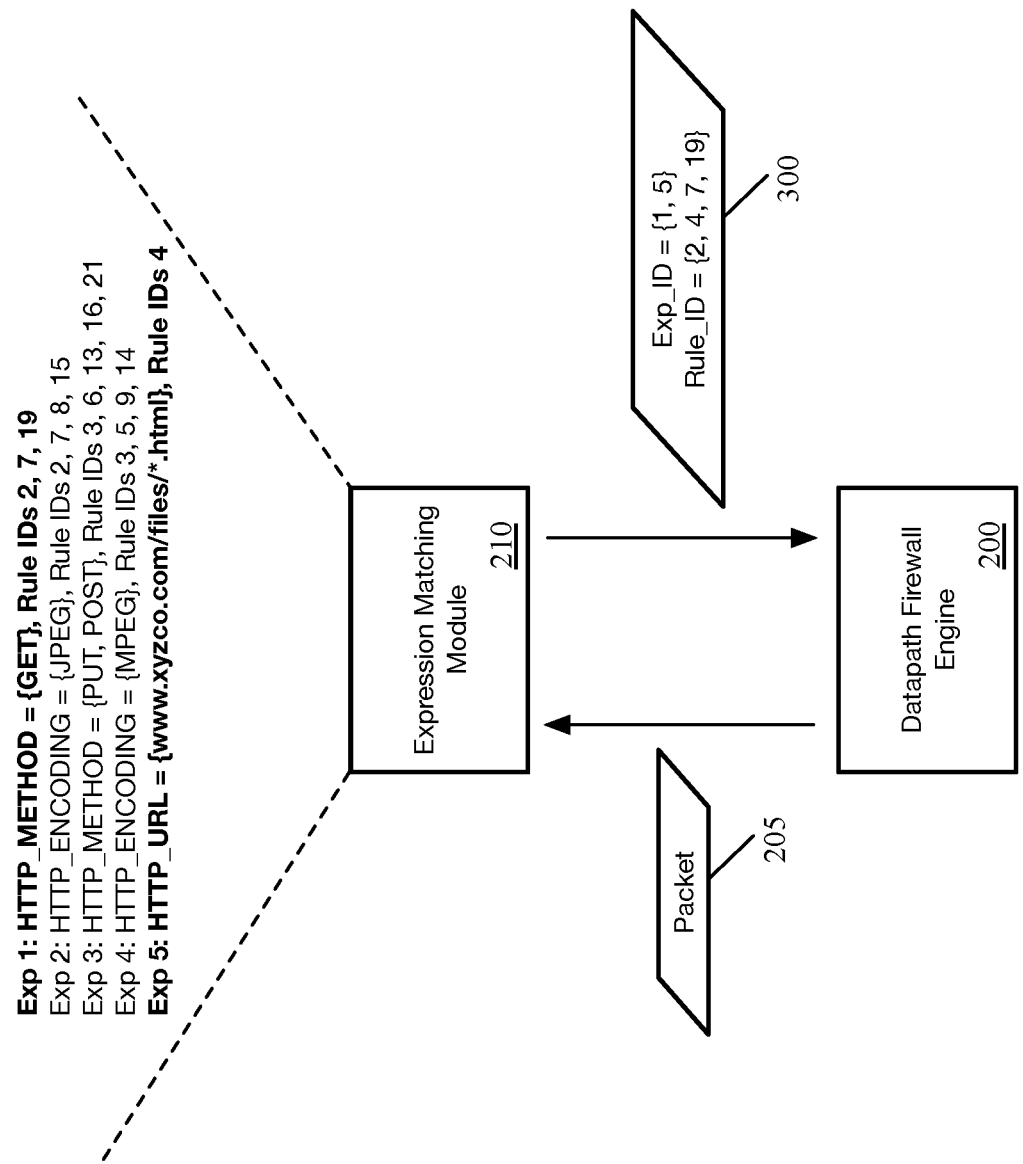
FIG. 3 conceptually illustrates these initial operations of a datapath firewall engine to process a packet.

FIG. 3 conceptually illustrates these initial operations of a datapath firewall engine 300 to process a packet 305. As shown, the packet 305 has L2-L4 header fields indicating that the packet is sent from source A (e.g., source address and port) to destination B (e.g., destination address and port), and includes the HTTP expressions "GET URL www.xyzco.com/files/xyz.html". While this is shown as a packet and the term packet is used throughout this specification, it should be understood that the term packet or data packet may refer herein to various formatted collections of bits that may be sent across a network, such as Ethernet frames, IP packets, TCP segments, UDP datagrams, etc.

The datapath firewall engine 300 stores various firewall rules, some of which are shown in the figure. In this example, rule 1 has the highest priority and rule 25 has the lowest priority of the illustrated rules (in many cases, the firewall will store hundreds or thousands of rules for each of multiple logical networks, depending on the complexity of the networks). The first rule specifies that all traffic from A to C should be dropped, the second rule specifies that traffic from A to B with specific expressions represented by identifiers 1 and 2 is allowed, etc. The $25^{th}$ rule specifies that all traffic from A to B should be dropped (though this rule is only applied if no higher-priority rules for traffic from A to B have been matched). In this case, as shown by the bolding of rule 2, the datapath firewall engine 300 identifies that rule 2 is the highest-priority rule matched by the L2-L4 header fields of the packet 305. Because this rule also includes matches over expression identifiers, the datapath firewall engine 300 sends the packet 305 to the expression matching module 310.

Returning to FIG. 2, the process 200 continues with the expression matching module receiving (at 220) the packet from the datapath firewall engine. The next set of operations are performed by the expression matching module, in order to provide data to the datapath firewall engine regarding the expressions present in the packet.

The process 200 then identifies (at 225) the L7 expressions present in the packet. In some embodiments, the process analyzes all of the higher-layer headers after the L4 protocol headers in the packet, and parses these headers to identify specific expressions. These expressions may include L7 protocol verbs and/or other expressions, such as HTTP (or HTTPS) methods and arguments of these methods. The methods can include operations such as get, put, post, delete, etc., and the arguments could include URLs and/or filepaths. Other types of expressions (for HTTP or for other protocols, such as FTP, SMTP, etc.) are also possible in various different embodiments. Each expression that is matched on by at least one of the firewall rules is provided an expression identifier, which is identified by the expression matching module analysis.

Next, the process 200 identifies (at 230) the firewall rules that match on the identified expressions. As described, some embodiments include a mapping of each expression identifier to the firewall rules that match on the expression identifier. Based on this mapping, the expression matching module can identify all of the firewall rules that match on at least one of the identified expressions.

With the expression matching module having performed its analysis of the packet, the process 200 provides (at 235) to the datapath (i) the expression identifiers for the expressions present in the packet and (ii) rule identifiers for the identified rules. Other embodiments perform further analysis to identify the rules for which all required expression identifiers are matched (irrespective of the L2-L4 matching requirements for those rules) and provide only these rules to the datapath firewall engine. In some embodiments, the packet is provided to the expression matching module via a function call, which returns a set of expression identifiers and a set of rule identifiers.

Figure 4:
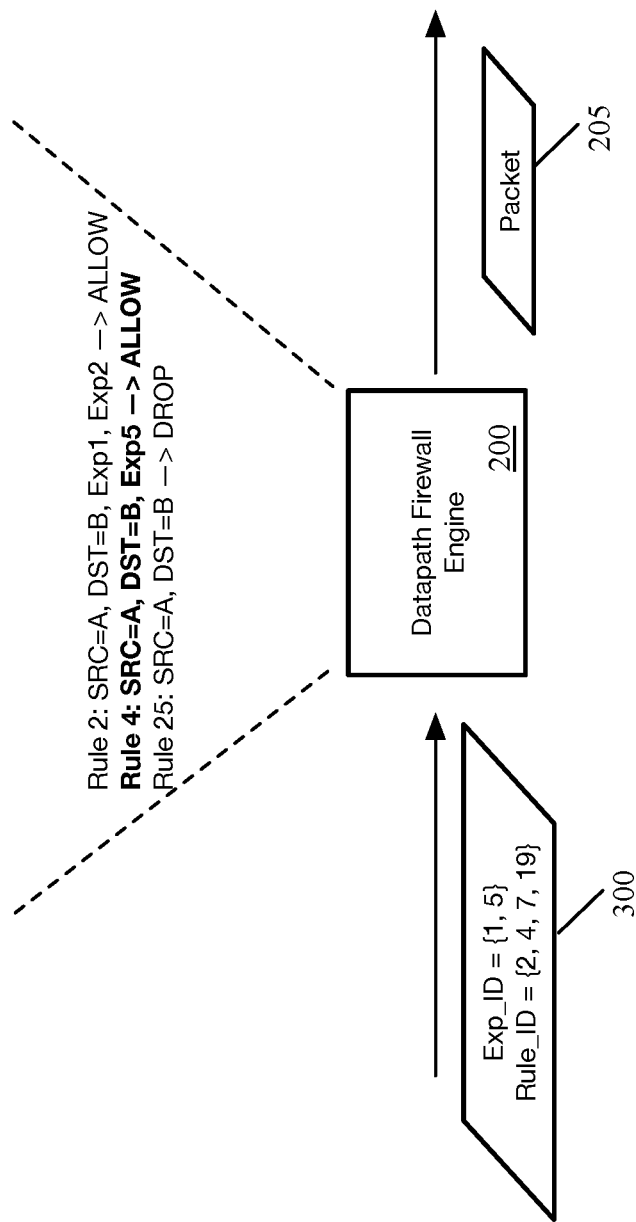
FIG. 4 conceptually illustrates the operations of an expression matching module on the packet from FIG. 3.

FIG. 4 conceptually illustrates the operations of the expression matching module 310 on the packet 305. As shown, the expression matching module 310 receives the packet 305 from the datapath firewall engine 300. As illustrated in FIG. 3, the packet includes the HTTP expressions "GET URL www.xyzco.com/files/xyz.html" in addition to its L2-L4 headers.

The expression matching module 310 stores at least five expressions (all HTTP), represented by expression identifiers 1-5. These include methods such as GET (expression 1), PUT and POST (matching on either satisfies expression 3), encoding identifiers such as JPEG (expression 2) or MPEG (expression 4) or specific URLs such as www.xyzco.com/files/*.html (expression 5). In this case, as shown by the bolded expressions, the packet includes expression 1 (a GET method) as well as expression 5 (the URL www.xyzco.com/files/xyz.html). Expression 1 maps to rule identifiers 2, 7, and 19, while expression 5 maps to rule identifier 4. As such, the expression matching module provides the set of identifiers 400 to the datapath firewall engine 300. This set of identifiers includes expression identifiers 1 and 5 and rule identifiers 2, 4, 7, and 19.

Returning again to the process 200, in some embodiments the datapath firewall engine identifies (at 240) all of the firewall rules matched by the L2-L4 headers of the packet. In some embodiments, the datapath firewall engine performs this operation in parallel with the expression matching module identifying expressions in the packet, so that the data is ready when the expression matching module completes its operations and provides the sets of rule and expression identifiers to the datapath firewall engine.

The process 200 receives at the datapath firewall engine (i) the expression identifiers for the expressions present in the packet and (ii) the rule identifiers for the identified rules. In addition, the datapath firewall engine has identified all of the rules matched by the L2-L4 packet headers at this point.

The process uses this data to identify (at 250) the highest-priority rule matched by the packet, including the L2-L4 headers and the L7 expressions present in the packet. In some embodiments, the datapath engine matches the rule identifiers received from the expression matching module with the identifiers for the rules that match the L2-L4 packet headers, and searches these starting at the highest priority rule to identify the first rule for which all of the criteria are matched by the packet. In other embodiments, the expression matching module returns all of the rules for which all expression requirements are matched, and the datapath firewall engine performs a cross-match to identify the highest-priority rule that matches the L2-L4 packet headers (from its own analysis at 240) and is in the list of rule identifiers received from the expression matching module as well. In some embodiments, when the firewall rules include a rule matching on the L2-L4 headers without any L7 expressions, this rule is considered also (though ideally this will be the lowest-priority of the matching rules).

Lastly, the process applies (at 255) the identified rule to the packet. These rules may include allowing or dropping/blocking packets, as well as other rules in some embodiments (e.g., block and log, allow and log, etc.). In addition, some embodiments store the result for the packet so that subsequent packets in the same data flow can be processed quickly without invoking the expression matching module and/or datapath firewall engine. The process then ends.

Figure 5:
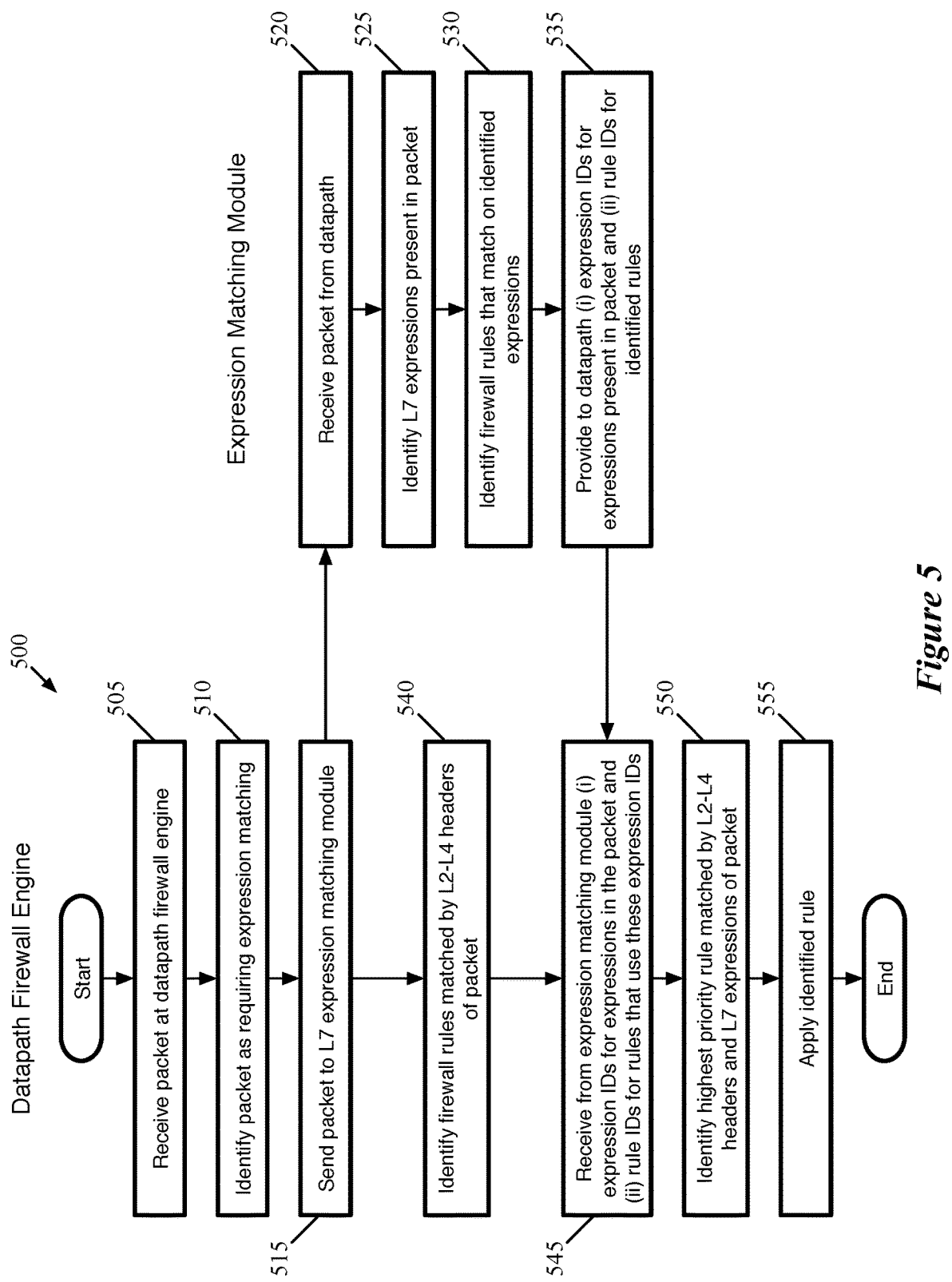
FIG. 5 conceptually illustrates the determination of a highest-priority matching firewall rule for the packet from FIG. 3 by the datapath firewall engine of some embodiments.

FIG. 5 conceptually illustrates the determination of a highest-priority matching firewall rule for the packet 305 by the datapath firewall engine 300 of some embodiments. The datapath firewall engine 300 receives the set of identifiers 400 as determined by the firewall matching module, and has also narrowed down the list of possible firewall rules to rules 2, 4, and 25, as these are the rules matched by the L2-L4 headers of the packet 305. Based on the expression identifiers received from the expression matching module, the highest-priority rule (rule 2) is not completely matched because it requires both expression 1 and expression 2. However, the packet does match the next rule (rule 4), as this only requires expression 1. This rule specifies for the firewall to allow the packet, so the datapath firewall engine 300 allows the packet 305 (so that it can be further processed by the datapath).

Figure 6:
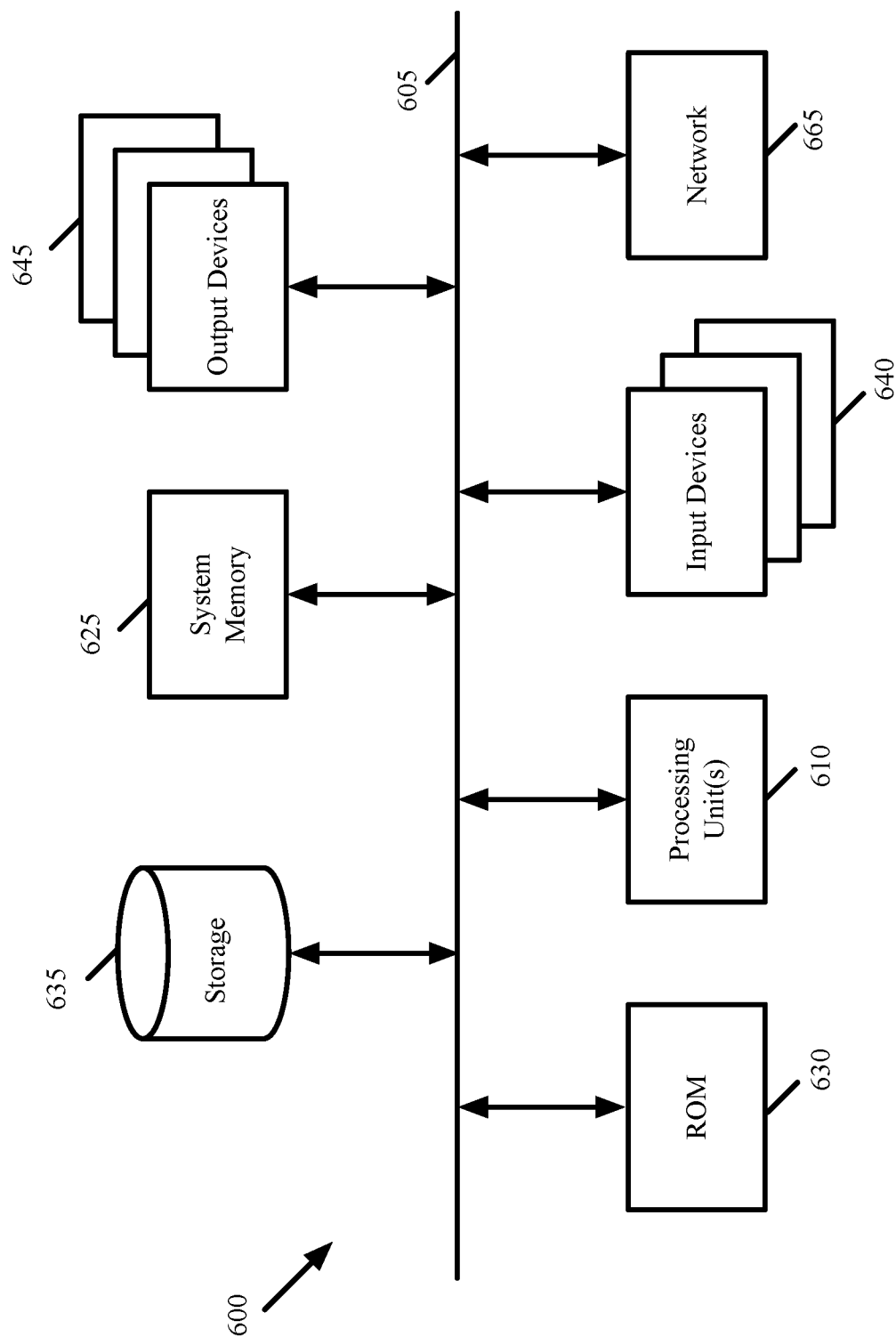
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For an expression matcher executing on a host computer, a method comprising:

receiving a packet from a datapath also executing on the host computer, the packet having a set of one or more layer 7 (L7) expressions;

identifying a set of firewall rules used by the datapath that match on expressions in the set of expressions of the received packet; and providing, to the datapath, (i) expression identifiers for the expressions in the received packet and (ii) rule identifiers for the firewall rules of the identified set, wherein the datapath uses the expression identifiers and additional packet header data from the packet to determine a matching firewall rule from the set of firewall rules identified by the rule identifiers to apply to the packet.

2. The method of claim 1, wherein the datapath executes in a kernel of the host computer and the expression matcher executes in a user space of the host computer.

3. The method of claim 2, wherein the datapath only sends packets to the expression matcher when the packets have at least one L7 expression.

4. The method of claim 2, wherein a plurality of firewall rules are stored on the host computer for use by the datapath, wherein prior to sending the packet to the expression matcher, the datapath:
   uses the additional packet header data from the packet to identify a highest-priority firewall rule matched by the additional packet header data from the plurality of firewall rules; and
   only sends the packet to the expression matcher when the identified highest-priority firewall rule matched by additional packet header data additionally matches on at least one L7 expression.

5. The method of claim 1, wherein the additional packet header data comprises layer 3 (L3) and layer 4 (L4) packet header fields.

6. The method of claim 1, wherein the firewall rules match on sets of connection 5-tuples and expression identifiers.

7. The method of claim 1, wherein identifying the set of firewall rules that match on the set of expressions comprises:
   determining the set of expressions present in the packet;
   for each expression in the set, identifying the firewall rules that match on the expression from a plurality of firewall rules used by the datapath.

8. The method of claim 7, wherein providing rule identifiers for the firewall rules comprises providing rule identifiers for all firewall rules in the plurality of firewall rules that match on at least one of the expressions in the set of expressions.

9. The method of claim 8, wherein the firewall rules in the set of firewall rules each match on a set of packet header field values and a set of expression identifiers.

10. The method of claim 9, wherein the datapath determines a matching firewall rule by identifying a highest-priority firewall rule of the identified set of firewall rules for which all packet header data field values and expression identifiers are matched by the packet.

11. The method of claim 9, wherein the plurality of firewall rules used by the datapath includes additional firewall rules not in the identified set of firewall rules, wherein at least two of the firewall rules match on a same set of packet header data field values with different expression identifiers.

12. A non-transitory machine readable medium storing an execution matcher for execution by at least one processing unit of a host computer, the program comprising sets of instructions for:

receiving a packet from a datapath also executing on the host computer, the packet having a set of one or more layer 7 (L7) expressions;

identifying a set of firewall rules used by the datapath that match on expressions in the set of expressions of the received packet; and providing, to the datapath, (i) expression identifiers for the expressions in the received packet and (ii) rule identifiers for the firewall rules of the identified set of firewall rules, wherein the datapath uses the expression identifiers and additional packet header data from the packet to determine a matching firewall rule from the set of firewall rules identified by the rule identifiers to apply to the packet.

13. The non-transitory machine readable medium of claim 12, wherein:
   the datapath executes in a kernel of the host computer and the expression matcher executes in a user space of the host computer;
   a plurality of firewall rules are stored on the host computer for use by the datapath; and
   prior to sending the packet to the expression matcher, the datapath:
      uses the additional packet header data from the packet to identify a highest-priority firewall rule matched by the additional packet header data from the plurality of firewall rules; and
      only sends the packet to the expression matcher when the identified highest-priority firewall rule matched by additional packet header data additionally matches on at least one L7 expression.

14. The non-transitory machine readable medium of claim 12, wherein the additional packet header data comprises layer 3 (L3) and layer 4 (L4) packet header fields.

15. The non-transitory machine readable medium of claim 12, wherein the set of instructions for identifying the set of firewall rules that match on the set of expressions comprises sets of instructions for:
   determining the set of expressions present in the packet;
   for each expression in the set, identifying the firewall rules that match on the expression from a plurality of firewall rules used by the datapath.

16. The non-transitory machine readable medium of claim 15, wherein the set of instructions for providing rule identifiers for the firewall rules comprises a set of instructions for providing rule identifiers for all firewall rules in the plurality of firewall rules that match on at least one of the expressions in the set of expressions.

17. The non-transitory machine readable medium of claim 16, wherein the firewall rules in the set of firewall rules each match on a set of packet header field values and a set of expression identifiers.

18. The non-transitory machine readable medium of claim 17, wherein the datapath determines a matching firewall rule by identifying a highest-priority firewall rule of the identified set of firewall rules for which all packet header data field values and expression identifiers are matched by the packet.

19. The non-transitory machine readable medium of claim 17, wherein the plurality of firewall rules used by the datapath includes additional firewall rules not in the identified set of firewall rules, wherein at least two of the firewall rules match on a same set of packet header data field values with different expression identifiers.

20. The non-transitory machine readable medium of claim 12, wherein the firewall rules match on sets of connection 5-tuples and expression identifiers.

* * * * *